United States Patent
Jeon et al.

(10) Patent No.: US 9,976,098 B2
(45) Date of Patent: May 22, 2018

(54) METHOD FOR PREPARING HIGH-QUALITY LUBRICANT FROM BIOMASS-DERIVED FATTY ACID

(71) Applicants: SK Innovation Co., Ltd., Seoul (KR); SK Lubricants Co., Ltd., Seoul (KR)

(72) Inventors: Hee Jung Jeon, Daejeon (KR); Ja Hyun Yang, Daejeon (KR); Tae Jin Kim, Seoul (KR); Young Hwan Lee, Daejeon (KR); Jong Chan Lee, Sejong (KR); Wan Seop Kwon, Daejeon (KR); Jin Hee Ok, Busan (KR)

(73) Assignees: SK INNOVATION CO., LTD., Seoul (KR); SK LUBRICANTS CO., LTD., Seoul (KR)

( * ) Notice: Subject to any disclaimer, the term of this patent is extended or adjusted under 35 U.S.C. 154(b) by 155 days.

(21) Appl. No.: 14/782,957

(22) PCT Filed: Apr. 8, 2014

(86) PCT No.: PCT/KR2014/003043
§ 371 (c)(1),
(2) Date: Oct. 7, 2015

(87) PCT Pub. No.: WO2014/168401
PCT Pub. Date: Oct. 16, 2014

(65) Prior Publication Data
US 2016/0040087 A1     Feb. 11, 2016

(30) Foreign Application Priority Data
Apr. 9, 2013 (KR) .................. 10-2013-0038455

(51) Int. Cl.
*C10M 135/34*   (2006.01)
*C10M 105/34*   (2006.01)
(Continued)

(52) U.S. Cl.
CPC ............ *C10M 105/24* (2013.01); *B01J 23/44* (2013.01); *C10G 3/44* (2013.01); *C10G 69/126* (2013.01);
(Continued)

(58) Field of Classification Search
CPC ... C10M 2207/281; C10G 35/095; C10G 3/00
(Continued)

(56) References Cited

U.S. PATENT DOCUMENTS

| | | | |
|---|---|---|---|
| 5,077,447 A | 12/1991 | Miller et al. | |
| 7,459,597 B2 | 12/2008 | Koivusalmi et al. | |

(Continued)

FOREIGN PATENT DOCUMENTS

| | | |
|---|---|---|
| KR | 10-2008-0079674 | 9/2008 |
| KR | 10-2009-0095631 | 9/2009 |

(Continued)

OTHER PUBLICATIONS

International Search Report dated Jul. 8, 2014 for corresponding international patent application No. PCT/KR2014/003043.
(Continued)

*Primary Examiner* — Vishal Vasisth
(74) *Attorney, Agent, or Firm* — Abelman, Frayne & Schwab (57) ABSTRACT

Disclosed is a method for producing a quality lubricant base oil (meeting the standard of Group III or higher) comprising: decarbonylating mixed fatty acids derived from oils and fats of biological origin to produce mixed olefins; oligomerizing the mixed olefins to produce an olefinic lubricant base oil; and performing hydrogenation to remove olefins from the olefinic lubricant base oil.

16 Claims, 7 Drawing Sheets

(51) Int. Cl.
  *C10G 45/00* (2006.01)
  *C07C 1/00* (2006.01)
  *C07C 4/00* (2006.01)
  *C10G 1/00* (2006.01)
  *C10M 105/24* (2006.01)
  *C10M 107/08* (2006.01)
  *C10M 177/00* (2006.01)
  *C10M 107/10* (2006.01)
  *C10G 69/12* (2006.01)
  *C10G 3/00* (2006.01)
  *B01J 23/44* (2006.01)
  *B01J 29/08* (2006.01)
  *B01J 35/00* (2006.01)
  *B01J 35/10* (2006.01)

(52) U.S. Cl.
  CPC ........ *C10M 107/08* (2013.01); *C10M 107/10* (2013.01); *C10M 177/00* (2013.01); *B01J 29/084* (2013.01); *B01J 35/0026* (2013.01); *B01J 35/1019* (2013.01); *B01J 35/1042* (2013.01); *B01J 35/1061* (2013.01); *B01J 2229/34* (2013.01); *C10G 2300/1011* (2013.01); *C10G 2400/10* (2013.01); *C10M 2205/0285* (2013.01); *C10N 2220/022* (2013.01); *C10N 2230/02* (2013.01); *Y02P 30/20* (2015.11)

(58) Field of Classification Search
  USPC .................. 508/300, 463; 208/142; 585/240
  See application file for complete search history.

(56) References Cited

U.S. PATENT DOCUMENTS

| | | |
|---|---|---|
| 7,888,542 B2 | 2/2011 | Koivusalmi et al. |
| 8,048,290 B2 | 11/2011 | Knuuttila et al. |
| 2007/0299291 A1 | 12/2007 | Koivusalmi |
| 2010/0234654 A1* | 9/2010 | Wang ................... C07C 29/149 585/254 |
| 2011/0190564 A1 | 8/2011 | Suzuki et al. |
| 2012/0115762 A1 | 5/2012 | Wang et al. |

FOREIGN PATENT DOCUMENTS

| | | |
|---|---|---|
| KR | 10-2011-0054298 | 5/2011 |
| KR | 10-2011-0105579 | 9/2011 |
| WO | 03-089388 | 10/2003 |
| WO | 2007/068800 | 6/2007 |

OTHER PUBLICATIONS

Supplementary European Search Report dated Dec. 23, 2016 for corresponding international patent application No. PCT/KR2014/003043.

* cited by examiner

| Olefin structure (C15 olefin) | Lube (Dimer) structure | Chain Length* | VI | PP/CP |
|---|---|---|---|---|
| ∿∿∿∿ | (branched structure) | 29 | ↑ VI increase | ↓ PP/CP decrease |
| ∿∿∿∿ | (branched structure) | 25 | | |
| ∿∿∿∿ | (branched structure) | 21 | | |
| ∿∿∿∿ | (branched structure) | 17 | | |

Chain Length*: No of carbon atoms of the longest chain in molecular structure

METHOD FOR PREPARING HIGH-QUALITY LUBRICANT FROM BIOMASS-DERIVED FATTY ACID

CROSS REFERENCE TO RELATED APPLICATIONS

This application is a national phase of PCT application No. PCT/KR2014/003043, filed Apr. 8, 2014, which claims priority to KR patent application No. 10-2013-0038455, filed Apr. 9, 2013, all of which are incorporated herein by reference thereto.

TECHNICAL FIELD

The present invention relates to the production of medium-to-large hydrocarbon compounds, for example, lubricant base oils, from biomass-derivative fatty acids. More particularly, the present invention relates to a method for producing a high-quality lubricant base oil (for example, meeting standard of Group III or higher), wherein the method comprises: converting mixed fatty acids derived from biomass of biological origin into mixed olefins through decarbonylation, in other words, decarbonylating mixed fatty acids derived from oils and fats of biological origin to produce mixed olefins; oligomerizing the mixed olefins to produce an olefinic lubricant base oil; and performing hydrogenation to remove olefins from the olefinic lubricant base oil.

BACKGROUND ART

Though petroleum energy has a contributed greatly to the development of human society, there are currently many problems associated with its use, including diminishing reserves, unequal distribution of resources, environmental pollution, and the like, thus active research has been conducted toward biomass as an entire/partial substitute for petroleum resources.

"Biomass" is, in a broad sense, intended to encompass all materials derived from biological origin. In a narrow sense, it refers to plants or plant-based materials such as corns, beans, linseeds, sugarcanes, palm oil, and so on, but its meaning may be generally expanded to living organisms, and metabolites partly responsible for carbon cycles.

Since the 1970s, preparation of high value-added materials from biomass has been under active study, but no independent models with commercial applicability have yet been suggested. The reasons may be found in some disadvantages of biomass as follows: First, the product from biomass is quantitatively limited. Petroleum resources, although locally distributed over the world, are yet quantitatively sufficient to meet the world's energy and chemical demands. In contrast, biomass, although omnipresent compared to petroleum resources, requires additional processes for the production thereof as useful materials. Hence, biomass is far inferior to petroleum resources in terms of output. Second, biomass is poor in cost competitiveness. Since biomass is produced fundamentally on the basis of consumption, it is difficult to find surplus biomass of low price as a feed for substituting for petroleum resources. Third, biomass is difficult to secure in a sufficient amount. For petroleum resources, the problem of creation does not exist because they are naturally occurring in particular regions and are produced in mining lots. On the other hand, since biomass fundamentally requires a large cultivation area for the production thereof, it is difficult to secure a large quantity of biomass for use as resources. Finally, since biomass-based products have been limited to alternatives to low-price materials such as gasoline or diesel, it is difficult to suggest models that can be independently commercialized without policy support.

Figure 1:
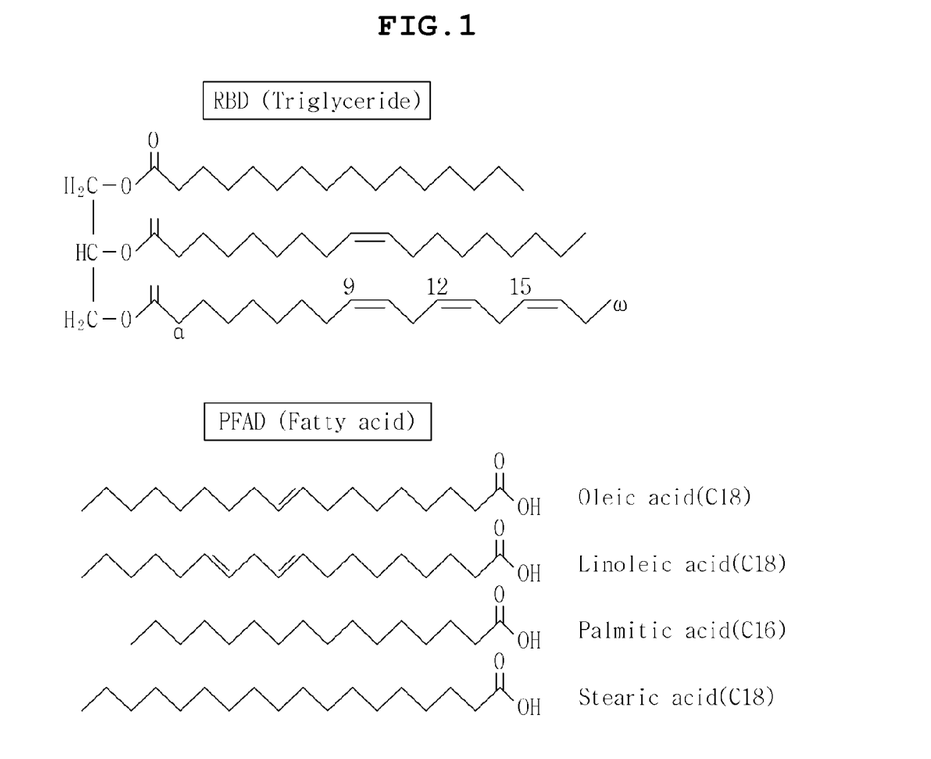
FIG. 1 shows typical chemical structures of triglyceride and fatty acids contained in CPO (crude palm oil).

In recent years, however, biomass production techniques have been improved to overcome the above-mentioned problems. Particularly as for CPO (Crude Palm Oil) and SBO (Soybean Oil) suggested as surplus biomass, their worldwide production amounts to as much as ones of million tons, and they can be bought in an amount of one million tons or more from the open market. In addition, with the increased production of the biomass products year by year, they have exhibited low price volatility and can be purchased from the open market. Further, CPO has attracted intensive attention as an alternative material to petroleum-based products since it can be obtained on a mass scale and its price is stabilized in the open market. CPO consist of 90 to 95% of triglycerides, a ratio of C16:C18 carbon chains, which mainly compose the triglycerides, is about 45:55 (by weight basis). The remainder except the triglycerides, that is, 5 to 10% by weight of COP is covered mainly by C16 and/or C18 fatty acids with a mono- or diglyceride content of approximately 10%. The triglyceride selectively isolated from refined CPO is called RBD (Refined Bleached Deodorized) palm oil while the removed fatty acids and mono- or diglycerides, amounting to 5~10% by weight, are called PFAD (Palm Fatty Acid Distillate). The amount currently obtained in the open market approximates 1,000,000 tons for CPO and 400,000 tons for PFAD. The RBD triglyceride, and illustrative fatty acids constituent of PFAD are depicted in FIG. 1. Carbon chains constituent of CPO and PFAD are listed in Table 1, below.

TABLE 1

| Fatty Acid | CPO[1] (wt %) | PFAD[2] (wt %) |
|---|---|---|
| 14:0 Myristic | 0.5 to 5.9 | 0.9 to 1.5 |
| 16:0 Palmitic | 32 to 59 | 43 to 51 |
| 16:1 Palmitoleic | <0.6 | — |
| 18:0 Stearic | 1.5 to 8.0 | 4 to 5 |
| 18:1 Oleic | 27 to 52 | 33 to 40 |
| 18:2 Linoleic | 5.0 to 14 | 9 to 11 |
| 18:3 Linolenic | <1.5 | 0.2 to 0.6 |
| 20:0 Eicosanoic | <1.0 | — |

[1]composed mainly of triglycerides
[2]composed mainly of fatty acids

Meanwhile, models for commercially producing high value-added products, such as lubricant base oils, other than fuels, from biomass have recently suggested. For example, Group BI lubricant base oils were produced from a material containing unsaturated compounds at a content of 50% by weight or higher by oligomerization, deoxygenation, and isodewaxing (IDW) (e.g., U.S. Pat. Nos. 7,459,597 and 7,888,542, etc.). The reactions described above aim for the polymerization of olefins present within biomass, and thus require that the material have an olefinic content of 50% or higher so as to increase activity. Since the polymerization is a random polymerization, it results in producing naphthenic lubricant base oils with a naphthenic content of about 72%. Particularly, isodewaxing is conducted to improve the lubricant base oils in fluidity. On the other hand, the technique for production of lubricant base oils from fatty acids was proposed through pre-hydrotreatment, ketonization, hydrodeoxygenation (HDO), and IDW (for example, U.S. Pat. No.

8,048,290). These processes are described to produce the product (Group III base oil) at a yield of 36% of the feed (fatty acids).

In addition, a process for producing 1-decene, used as a raw material of PAO (poly alpha-olefin), and ester lubricant base oils corresponding to class Group V from triglycerides is known (U. S. Patent Application No. 2012/0115762). The method consists of metathesis, oligomerization, and hydroisomerization. For economical profits, it is important to control the content of C18:1 to a high level in the technique. Further, it is necessary to prevent the structure collapse of ester and the inactivation of precious metal catalysts during a hydrogenation for the skeletal isomerization of esters

DISCLOSURE

Technical Problem

According to one exemplary embodiment of the present invention, a method is provided for producing a high quality lubricant base oil (particularly, lubricant base oil of Group III or higher, more particularly lubricant base oil of Group III+) economically and efficiently from a biomass-derived fatty acid via a reaction route different from the conventional art.

Technical Solution

In accordance with an aspect thereof, the present invention provides a method for producing a lubricant base oil from a biomass-derived fatty acid, comprising:

a) providing biomass-derived mixed fatty acids;

b) decarbonylating the mixed fatty acids to produce mixed olefins;

c) oligomerizing the mixed olefins to produce an olefinic lubricant base oil; and d) performing hydrogenation to remove olefins in the olefinic lubricant base oil.

In one exemplary embodiment of the present invention, the fatty acids of step a) may comprise fatty acids derived from triglyceride of biomass by de-esterification, fatty acids contained in biomass itself, or a combination thereof.

In another exemplary embodiment of the present invention, the step a) may further comprise a pre-hydrotreatment (pre-HDT) step, wherein at least a part of double bonds which may be present in fatty acid may be removed by saturation.

In another exemplary embodiment of the present invention, olefins in the mixed olefins produce in step b) is fewer by one in the number of carbon atoms than corresponding fatty acids of the mixed fatty acids.

In another exemplary embodiment of the present invention, the method may optionally further comprise an isomerization step, after step d), to further improve low-temperature properties of the lubricant base oil.

Advantageous Effects

According to an exemplary embodiment of the present invention, high-quality lubricant base oils (for example, Group III lubricant base oils, more particularly, Group III+ lubricant base oils) can be prepared by controlling the positions of double bonds in mixed olefins which are converted from mixed fatty acids derived from various biomass. Particularly, the oligomerization is allowed to occur at the double bond of alpha-position or its shifted positions in the olefins produced by decarbonylation, rather than at the double bonds preexisting in the biomass, so that the resulting lubricant base oils can be provided with high viscosity indices, and low pour points and cloud points, without the isomerization that is requisite for conventional techniques. Moreover, any fatty acid derived from biomass can be prepared into a quality lubricant base oil through simply operable decarbonylation and oligomerization processes according to an embodiment of the present invention. Further, the quality of lubricant base oil can be controlled as needed, without changing raw materials, according to an embodiment the method of the present invention. Therefore, the present invention is expected to bring about a significant ripple effect on the economy and to find a wide range of applications.

BEST MODE

Reference will now be made in greater detail to a preferred embodiment of the invention with reference to the accompanying drawings.

Hereinbelow, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted.

Figure 2:
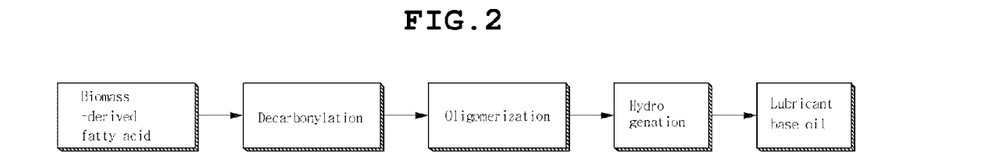
FIG. 2 is a process diagram illustrating the production of a lubricant base oil from a biomass-derived fatty acid according to an exemplary embodiment of the present invention.

An aspect of the present invention addresses the production of a high quality lubricant base oil from a biomass-derived fatty acid by decarbonylation, oligomerization, and hydrogenation, as illustrated in FIG. 2.

According to the API classifications, Lubricant base oils are categorized based on their mechanical and chemical properties as in Table 2, below.

TABLE 2

| | Viscosity Index | Sulfur Content (wt %) | Pour Point (° C.) | Saturated (wt %) |
|---|---|---|---|---|
| Group I | 80 to 119 | >0.03 | −5 to 15 | <90 |
| Group II | 80 to 119 | ≤0.03 | −10 to −20 | ≥90 |
| Group III | ≥120 | ≤0.03 | −10 to −25 | ≥90 |
| Group III+ | ≥140 | ≤0.03 | −15 to 30 | >90 |
| Group IV | 135 to 140 | — | −53 | — |
| Group V | 140 | — | −21 | — |

For the production of lubricant base oils from biomass-derived fat and oils (triglycerides and/or fatty acids), conventional techniques are based on the oligomerization of olefins already present in the biomass, the ketonization of fatty acids, and the degradation of triglycerides. Particularly, the oligomerization of olefins already present within the biomass requires a separate isomerization process for reducing the pour point, and the production activity for the production is determined according to the olefin content of the feed. For the ketonization of fatty acids, isomerization is also required because the carbon chains of the fatty acids are excessively long. The degradation of triglycerides is greatly dependent on the numbers of double bonds and the numbers of carbon atoms of the branches in triglycerides In an exemplary embodiment of the present invention, as illustrated in FIG. 2, a reaction route for producing a high quality lubricant base oil is composed of decarbonylation, oligomerization, and hydrogenation in sequence. Unlike the conventional techniques in which oligomerization is carried out on the basis of the double bonds randomly present within biomass-derived fatty acids, selective oligomerization is induced by controlling the positions of double bonds within the olefins produced from fatty acids through decarbonylation in accordance with an embodiment of the present invention. As a result, since lubricant base oils having a structure similar to radial symmetry of PAO can be produced, quality lubricant base oils having high viscosity index and low pour point and cloud point (for example, lubricant base oils of Group III or higher, particularly Group III+ lubricant base oils) can be produced by the method of the present invention without conducting isomerization. By the aforementioned process configuration, a lubricant base oil with various properties can be reproducibly produced from any specific biomass-derived fatty acid as a feedstock.

As double bonds are nearer to the alpha position in the mixed olefins (particularly C15 and C17 mixed olefins) which are converted from biomass-derived mixed fatty acids, the final produced lubricant base oils tend to increase in viscosity index as well as pour point and cloud point. In contrast, the position of double bonds are nearer to the center of the hydrocarbon chain, the final produced lubricant base oils tend to decrease in viscosity index, pour point, and cloud point. Accordingly, physical properties of lubricant base oils can be tuned by simply shifting the positions of double bonds in the mixed olefins through the modification of decarboxylation reaction conditions without altering the feed fatty acids. Particularly, oligomerization is induced mostly in the double bond at alpha position (or shifted double bond) of the olefins produced by decarbonylation in accordance with an embodiment of the present invention, and the resulting oligomers form radially symmetric structures. Hence, the oligomers have low pour points and cloud points although containing many carbon atoms (for example, 30 or more carbon atoms).

Provision of Biomass-Derived Fatty Acid

According to an embodiment of the present invention, fatty acids may be obtained from various animal and vegetable oils and fats known in the art. Illustrative among the animal oils and fats are fish oils, beef tallow, lard, sheep tallow, and butter. Examples of the vegetable oils and fats include sunflower seed oil, canola oil, palm oil, corn seed oil, cotton seed oil, rapeseed oil, linseed oil, safflower seed oil, oat oil, olive oil, palm oil, peanut oil, apricot seed oil, almond oil, avocado oil, olive oil, camellia oil, rice bran oil, cotton seed oil, peanut oil, walnut oil, rapeseed oil, rice bran oil, linseed oil, sesame oil, soybean oil, castor oil, cocoa butter, and palm kernel oil, but are not limited thereto. The oils and fats may be used alone or in combination. Kinds of biomass available in the present invention are listed, together with the fatty acids contained therein and their contents, in Tables 3 and 4, below.

TABLE 3

| Fatty Acid | Soybean oil | Corn oil | Cotton seed oil | Sunflower seed oil | Peanut oil | Olive oil | Rapeseed oil |
|---|---|---|---|---|---|---|---|
| 14:0 Myristic | 0.4 | <0.1 | 0.4~2.0 | <0.5 | <0.4 | 0.05 | <1.0 |
| 16:0 Palmitic | 7~14 | 8~9 | 17~31 | 3~10 | 6.0~16 | 7.5~20 | 1.5~6.4 |
| 16:1 Palmitoleic | <0.5 | <0.5 | 0.5~2.0 | <1.0 | <1.0 | 0.3~3.5 | <3.0 |
| 18:0 Stearic | 1.4~5.5 | 0.5~4.0 | 1.0~4.0 | 1.0~10 | 1.3~6.5 | 0.5~3.5 | 0.5~3.1 |
| 18:1 Oleic | 19~30 | 19~50 | 13~44 | 14~65 | 35~72 | 56~83 | 8~45 |
| 18:2 Linoleic | 44~62 | 34~62 | 33~59 | 20~75 | 13~45 | 3.5~20 | 11~29 |
| 18:3 Linolenic | 4.0~11 | <2.0 | 0.1~2.1 | <0.7 | <1.0 | <1.5 | 5~16 |
| 20:0 Eicosanoic | <1.0 | <1.0 | <0.7 | <1.5 | 1.0~3.0 | | <3.0 |
| 20:1 Eicosenoic | <1.0 | <0.5 | <0.5 | <0.5 | 0.5~2.1 | | 3~15 |
| 22:0 Docosanoic | | <0.5 | <0.5 | <1.0 | 1.0~5.0 | | <2.0 |
| 22:1 Erucic | | | <0.5 | <0.5 | <2.0 | | 5~60 |
| 24:0 Tetracosanoic | | <0.5 | <0.5 | <0.5 | 0.5~3.0 | | <2.0 |
| 24:1 Tetracosenoic | | | | <0.5 | | | |

TABLE 4

| Fatty Acid | Cocoa butter | Palm Oil | Palm Kernel Oil | Coconut Oil | Butter | Lard | Beef Tallow |
|---|---|---|---|---|---|---|---|
| 4:0 Butyric | | | | | 3.6 | | |
| 6:0 Caproic | | | <0.5 | <1.2 | 2.2 | | |
| 8:0 Caprylic | | | 2.4~6.2 | 3.4~15 | 1.2 | | |
| 10:0 Capric | | | 2.6~7.0 | 3.2~15 | 2.8 | | |
| 12:0 Lauric | | <1.2 | 41~55 | 41~56 | 2.8 | | |
| 14:0 Myristic | 0.1 | 0.5~5.9 | 14~20 | 13~23 | 10.1 | 2.0 | 2.5 |
| 14:1 Myristoleic | | | | | | | 3.0 |
| 16:0 Palmitic | 26.0 | 32~59 | 6.5~11 | 4.2~12 | 25.0 | 27.1 | 27.0 |
| 16:1 Palmitoleic | 0.3 | <0.6 | 1.3~3.5 | 1.0~4.7 | 2.6 | 4.0 | 10.8 |
| 18:0 Stearic | 34.4 | 1.5~8.0 | 10~23 | 3.4~12 | 12.1 | 11.0 | 7.4 |
| 18:1 Oleic | 34.8 | 27~52 | 0.7~54 | 0.9~3.7 | 27.1 | 44.4 | 47.5 |
| 18:2 Linoleic | 3.0 | 5.0~14 | | | 2.4 | 11.4 | 1.7 |
| 18:3 Linolenic | 0.2 | <1.5 | | | 2.1 | | 1.1 |
| 20:0 Eicosanoic | 1.0 | <1.0 | | | | | |
| 22:0 Docosanoic | 0.2 | | | | | | |

As shown in Tables 3 and 4, biomass derived from various animals and plants have fatty acids of 4 to 24 carbon atoms, particularly with the enrichment of fatty acids of 16 or 18 carbon atoms. The triglyceride or some mono- or diglyceride may be converted into mixed fatty acids through de-esterification, as illustrated in the following Reaction Scheme 1.

[Reaction Scheme 1]

Triglyceride

Mixed Fatty acid carbon atoms. For example, the content of fatty acids of 16 and/or 18 carbon atoms in the total fatty acids may be about 80% by weight, particularly, at least about 85% by weight, and more particularly about 90 to 99% by weight. Of course, biomass may contain fatty acids with various numbers of carbon atoms, according to its origin.

As described above, biomass-derived oils and fats mostly comprise triglycerides and fatty acids. In this regard, ratios of triglyceride:fatty acid (weight basis) may be, for example, about 100:1 to 6:1, particularly about 20:1 to 6:1, and more particularly about 10:1 to 6:1, but may vary depending on the source of biomass. Accordingly, the present invention is not limited by the numerical ranges.

In addition, each chain of the triglyceride has a length of about 4 to 24 carbon atoms, and more typically 16 or 18

The de-esterification reaction illustrated above is a typical reaction for producing FAME (fatty acid methyl ester) from biomass.

According to an exemplary embodiment, the de-esterification may be carried out in the presence of a strong acid (for example, $H_2SO_4$, $HNO_3$, etc.) or a strong base (for example, NaOH, KOH, etc.) or under the provision of high-temperature (typically, about 100 to 300° C., and more typically about 100 to 200° C.) steam to convert triglyceride into fatty acids. In addition, any reaction that is known in the art to convert triglyceride into fatty acids may be used without limitations. Decarbonylation itself is not greatly affected by the content of double bonds within a feed (although a reaction condition such as a reaction temperature is partially affected), but the content of double bonds may be about 80% or less of the total carbon bond in the mixed fatty acids, particularly about 60% or less, and more particularly about 50% or less.

In an exemplary embodiment, the step of providing biomass-derived mixed fatty acids may further comprise a pre-hydrotreatment (pre-HDT) step in which at least a part of the double bonds of the triglyceride (inclusive of mono- and diglyceride) is removed by saturation. In this context, the pre-HDT reaction may saturate at least about 50%, particularly at least about 80%, and more particularly at least about 90% of the double bonds.

The pre-HDT may be conducted in the presence of a hydrotreating catalyst known in the art (e.g., a metal selected from among Co, Ni, Mo, W and a combination thereof on an oxide support selected from among silica, alumina, silica-alumina, magnesia, titania, and zirconia). Hydrodeoxygenation may also occur concurrently, but is undesired because it may reduce the yield of olefin upon the subsequent decarbonylation.

An important consideration in providing fatty acids via Reaction Scheme 1 is the selection of biomass materials. Although any biomass oil and fat may be employed, the biomass material that satisfies the condition of production in a commercially applicable quantity, the formation of a commercially available market, and stable price volatility is preferred. For this, CPO (Crude palm oil) and SBO (Soybean oil) may be used. Since these biomass materials are produced in hundreds of tons per year, with the trade volume of one hundred tons or more through the open market, a commercially applicable amount of the materials can be stably secured. Particularly, the materials contain triglycerides composed mostly of C16 and C18 chains. For example, the ratio of C16/18 approximates 1 in CPO and 0.25 in SBO. For use in special purposes (e.g., food, cosmetics, etc.), only triglycerides are separated from the materials. The remainder is a fatty acid distillate composed mostly of fatty acids (typically, fatty acids 90% or higher). The remainder that is free of the triglyceride RBD (refined, bleached, deodorized) palm oil in CPO may be called PFAD (palm fatty acid distillate), and the remainder that is free of triglycerides in SBO may be called SFAD (soy fatty acid distillate). These fatty acid distillates as by-products generated during the purification of triglycerides have been traded at relatively low price because their limited use. The inexpensive fatty acid distillates are advantageous in that they can be directly applied to the subsequent decarbonylation reaction without the pre-reactions such as the de-esterification of triglycerides.

As such, the mixed fatty acids used in the subsequent decarbonylation reaction may be fatty acids converted from triglyceride, a fatty acid distillate (fatty acid already present in the biomass material), or a combination thereof.

Decarbonylation

In one embodiment of the present invention, the biomass-derived mixed fatty acids are converted into mixed olefins by decarbonylation. The reaction mechanism of converting a fatty acid into an olefin by decarbonylation is known in the art. Typically, the olefin produced by decarbonylation is fewer in chain length by one carbon atom than the fatty acid. That is, a oxygen present in a fatty acid molecule is removed in the form of carbon monoxide (CO) by decarbonylation, and the number of carbon atoms of the product is fewer by one than the fatty acid from which it originates.

According to one exemplary embodiment, most of fatty acids that constitute the biomass-derived oils and fats are C16 and/or C18 fatty acids so that the resulting mixed olefins may have, for the most part, a chain length of 15 and/or 17 carbon atoms. However, these compositions characteristics may vary depending on biomass origin, as described above. In addition, when account is taken of the fact that various biomass-derived fatty acids range in the number of carbon atoms from 4 to 24 as shown in Tables 3 and 4, the mixed olefins resulting from the decarbonylation may be C3 to C24 in length.

In one exemplary embodiment, so long as it produce olefins (that is, double bond) from fatty acids through decarbonyl reaction, any catalyst system (particularly, a metal catalyst system) can be employed. For instance, a chelating catalyst of transition metal may be employed. The transition metal may be in Groups 8 to 11 on the Periodic Table, and more particularly may be exemplified by Pd, Rh, Ir, Cu, and Fe. As a ligand of the chelator, a phosphorus-based ligand, more particularly, a phosphine-based ligand may be employed, such as triphenylphosphine, diphenyl phosphine-$C_{4-7}$ paraffin. In this regard, the ligand may be used in an amount of about 1 to 50 moles per mole of the transition metal in the catalyst, particularly in an amount of about 1 to 20 moles, and more particularly in an amount of about 1 to 10 moles. In addition, CO and/or halogen (particularly Cl) may be further introduced into the catalyst in order to increase the decarbonylation reaction activity or to control positions of double bonds in the olefine product.

The mechanism of producing olefins through the decarbonylation of carboxylic acid in the presence of a metal chelating catalyst may be illustrated as shown in the following Reaction Scheme 2.

[Reaction Scheme 2]

In the reaction scheme, in more detail, the produced $H_2O$ is removed with the aim of continuing the decarbonylation, and an acid anhydride may be selectively added to the reaction system to induce the polycondensation of fatty acids. Typical examples of the acid anhydride include acetic anhydride ($Ac_2O$) and propionic anhydride. The acid anhydride may be used in an amount of up to about 50 moles per mole of fatty acid, particularly in an amount of about 2 to 20 moles, and more particularly in an amount of about 2 to 10 moles. In one exemplary embodiment, the acid anhydride may be introduced into the reaction system under a CO or $N_2$ atmosphere (supply).

The decarbonylation reaction may be carried out at about 120 to 400° C. (particularly, at about 150 to 300° C., more particularly at about 180 to 250° C.) under a CO condition of about 50 bar or less (particularly about 30 bar or less, more particularly about 1 to 20 bar). In another exemplary embodiment, the reaction may be conducted in a batch mode or a continuous mode, with preference for a batch mode in terms of convenience.

The mixed fatty acids, as a reaction feedstock for decarbonylation, may comprise a certain level of unsaturated fatty acids having intramolecular double bonds which are derived from triglyceride or already present. For this, decarbonylation may be carried out at relatively low temperatures, compared to that for saturated fatty acids alone.

Figure 3:
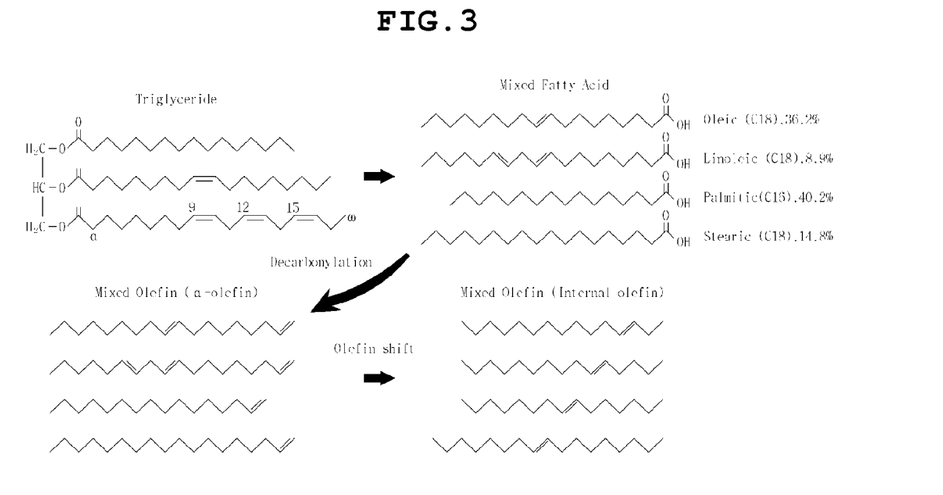
FIG. 3 shows a reaction scheme for producing mixed olefins by decarbonylating mixed fatty acids converted from triglycerides (including shift of double bond in olefin).

FIG. 3 shows a reaction scheme for producing mixed olefins by decarbonylating mixed fatty acids converted from triglycerides (including double bond shift in the mixed olefins).

An attractive point of the decarbonylation reaction is that the positions of double bonds in the mixed olefins have a significant influence on the physical properties of the final lubricant base oil. Therefore, as shown in FIG. 3, a double bond is formed at alpha position in the mixed olefins as a result of the decarbonylation of the mixed fatty acids, and is shifted toward the center of the carbon chains to produce internal olefins (in some cases, double bonds already present in fatty acid can be shifted, as well).

When the decarbonylation is performed at low temperatures for a short period of time, alpha-olefin selectivity in the produced olefins tends to increase. In contrast, a decarboxylation condition set to have a high temperature and a long time increases the content of internal olefins.

In fact, at a decarbonylation temperature of about 240° C., the double bond at alpha position may be shifted to afford internal olefins. In principle, oligomerization of alpha-olefins is advantageous in increasing the viscosity index of the final lubricant base oil, but it may decrease in pour point and cloud point. Hence, the ratio of alpha-olefins and internal olefins in the mixed olefins should be properly controlled to improve the physical properties of the final lubricant base oil. In theory, the content of alpha-olefins in the mixed olefins may vary from 0 to 100 mol %. The content of alpha-olefins may range from about 0 to 80 mol %, and particularly from about 0 to 70 mol % depending on the circumstances. However, the numerical limitation does not act as a limitative factor in the present invention. By properly controlling decarbonylation conditions, a desired ratio of alpha-olefins and internal olefins can be achieved.

In this context, a temperature condition for the decarbonylation reaction may be set to be, for example, about 250° C. or less, and particularly 240° C. or less. A fatty acid distillate, such as PFAD, may be decarbonylated at about 180 to 250° C. This decarbonylation may continue for about 1 to 600 min, particularly for about 1 to 180 min, and more particularly for about 1 min to 60 min.

Oligomerization Step

In accordance with an embodiment of the present invention, the mixed olefins (particularly, C15 and/or C17 olefin) obtained through the decarbonylation are oligomerized. That is, the mixed olefins converted by decarbonylation are oligomerized to produce an olefinic lubricant base oil containing double bonds.

In this context, the oligomers are typically, for the most part, dimers and/or trimer, and may contain a small amount of tetramers or higher. When the olefins obtained in the decarbonylation have a chain length less than 15 and/or 17 carbon atoms, the dominant component of the oligomer may be trimers or higher. Particularly, tetramers or higher may dominate over other oligomers when the olefins the olefins obtained in the decarbonylation have a chain length of 11 carbon atoms or less. On the other hand, dimers are predominant in the oligomers obtained from the olefins having a chain length of 17 carbon atoms or more.

The oligomerization mainly occurs at the double bond additionally formed by the decarbonylation, but may be further performed at the double bond preexisting in the biomass-derived fatty acid. In this case, because the radial symmetry of the oligomers as well as the resulting viscosity index (one of the important properties of lubricant base oils) can be affected, conditions for the decarbonylation should be properly controlled.

Figure 4:
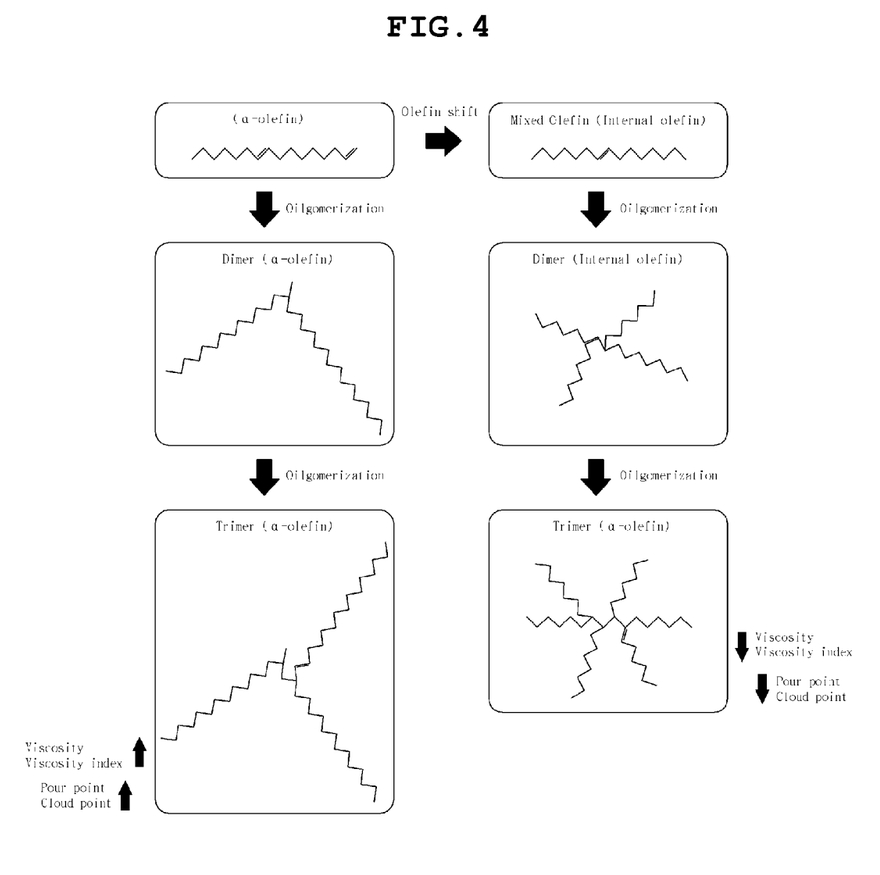
FIG. 4 is a reaction scheme for the oligomerization of olefins (alpha-olefins and internal olefins according to an exemplary embodiment of the present invention.

FIG. 4 is a reaction scheme for the oligomerization of olefins (alpha-olefins and internal olefins). As can be seen, olefinic lubricant base oils (oligomers) having different properties are produced according to the position of double bonds in the olefins.

Figure 5:
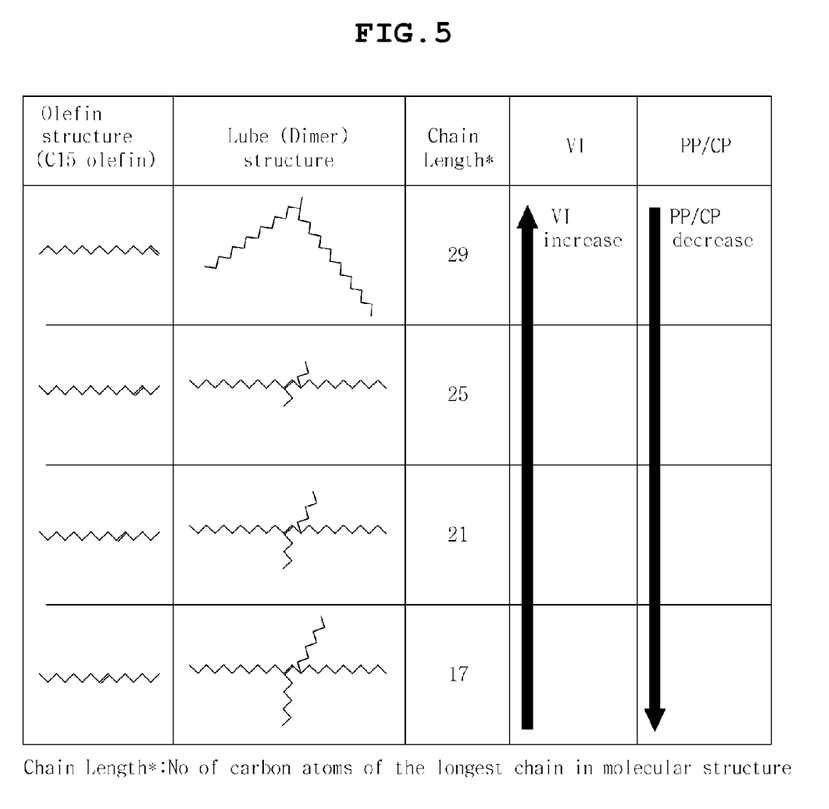
FIG. 5 shows structures and properties of the olefinic lubricant base oils (oligomers) produced from olefins by oligomerization (dimerization) according to an exemplary embodiment of the present invention.

FIG. 5 shows structures and properties of the olefinic lubricant base oils (oligomers) produced from olefins of the same chain length by oligomerization (dimerization) according to the position of a double bond in the olefins. As can be seen, when produced from the alpha-olefin, the oligomeric lubricant base oil increases in unit chain length, which results in increasing the viscosity index, but the pour point and the cloud point are also increased. In contrast, the oligomers derived from internal olefins have relatively short unit chains, and are advantageous in low pour point and cloud point, but the viscosity index is also decreased. In full consideration of the tendency of properties, the number (composition) and position of double bonds in the olefins obtained by decarbonylation are controlled to set the important properties of lubricant base oil, including viscosity index, pour point and cloud point within an optimal range.

According to one embodiment of the present invention, the oligomerization may be conducted in the presence of a catalyst exemplified by a cationic polymerization catalyst, a metallocene catalyst, and a Ziegler-Natta catalyst. Typically, a cationic polymerization catalyst may be used.

Illustrative examples of the cationic polymerization catalyst include zeolite, and clay (particularly montmorillonite, kaolin, etc.). Further, cationic polymerization catalysts with SAPO or ALPO structures may be available. In addition, catalysts in which aluminum (Al) is supported on mesoporous silica such as SBA-15, MCM-41, MCM-48, etc. (an Al content of about 0.1 to 50% by weight, particularly about 5 to 35% by weight) may be used. Representative among the zeolite are Y-zeolite (particularly USY zeolite with high SAR (silica alumina ratio)), ZSM-5, and beta-zeolite. Particularly, for Y-zeolite, USY zeolite with an SAR of at least about 0.5, particularly at least 12, more particularly about 30 to 150, even more particularly about 50 to 100 is advantageous.

In addition, metal catalysts having hydrotalcite or spinel structures, or strong acid catalysts such as niobic acid may be employed. Moreover, an RFCC catalyst, a mixture of Y-zeolite and kaolin (for example, a weight ratio of Y zeolite:kaolin is in an about 5 to 50% by weight), particularly an RFCC flash catalyst or an RFCC Equilibrium Catalyst (E-cat.) may be used.

According to one exemplary embodiment of the present invention, the oligomerization may be conducted at a temperature condition of about 120 to 400° C. (particularly about 150 to 300° C., and more particularly about 180 to 250° C.) in the presence of a cationic polymerization catalyst. In this regard, the reaction may continue for about 1 min to 24 hrs, and particularly for about 30 min to 5 hrs (batch type). Alternatively, the oligomerization may be carried out in a continuous manner (e.g., using a CSTR reactor). For this, the weight hourly space velocity (WHSV) of the feed may be set to range from about 0.01 to 10 $hr^{-1}$, and particularly from about 0.1 to 5 $hr^{-1}$. After the oligomerization, the coke formed on the catalyst can be removed simply by air burning, with the concomitant recovery of the catalyst activity closely to the initial state.

When using a metallocene catalyst or a Ziegler-Natta catalyst, the oligomerization may be advantageously performed at about 100° C. or less in a batch-type reactor, but the present invention is not limited thereby.

The olefinic lubricant base oil produced by the oligomerization can be controlled to have the following properties:
  Content of dimer (D): about 10 to 100% by weight (more particularly about 50 to 90% by weight),
  Content of trimer or higher (T+): about 0 to 90% by weight (more particularly, about 10 to 50% by weight),
  Ratio of dimer/trimer or higher (D/T+; weight basis): about 0.1 to 100 (particularly about 1 to 10, more particularly about 1 to 4), and
  Chain length (Number of carbon atoms of the longest chain in the oligomer molecule): about 15 to 33 (particularly, about 16 to 31)
  Hydrogenation (Hydrotreatment or Hydrofinishing)

The olefinic lubricant base oil produced by the oligomerization has an intermolecular double bond. Thus, the double bond (that is, olefin) is preferably removed in terms of the oxidative stability of the final product. In this regard, the double bond is removed to be saturated by hydrogenation in accordance with an embodiment of the present invention.

So long as it is used in typical oil refining processes, any catalyst may be available for the hydrogenation without limitations. In detail, a metal belonging to Group 6, 8, 9, 10, 11, or 12 on the Periodic Table may be used. For example, Pt, Pd, Ni, Fe, Cu, Cr, V, and Co may be used alone or in combination. Particularly, Pt and/or Pd may be used. For use in the hydrogenation, the metal may also be supported on an inorganic oxide support selected from among alumina, silica, silica-alumina, zirconia, ceria, titania, zeolite (e.g., Y zeolite (particularly having an SAR of about 12 or higher)), clay, SAPO, AlPO, and a combination thereof.

As the hydrogenation conditions, a reaction temperature may be set to range from about 150 to 500° C. (particularly, about 180 to 350° C., more particularly about 200 to 350° C.), an $H_2$ pressure from about 5 to 200 bar (more particularly from about 20 to 180 bar), and a GOR ($H_2$/feed ratio) from about 300 to 2000 $Nm^3/m^3$ (more particularly from about 500 to 1500 $Nm^3/m^3$). For a continuous-type reaction (for example, using a CSTR reactor), a weight hourly space velocity (WHSV) may be set to be about 0.1 to 5 $hr^{-1}$, particularly about 0.1 to 3 $hr^{-1}$, and more particularly about 0.1 to 1 $hr^{-1}$.

As described above, the lubricant base oil produced from biomass-derived fatty acids by decarbonylation, oligomerization, and hydrogenation has a viscosity index of about 118 (particularly at least about 125), a pour point of about −40° C. or less (particularly about −41 to −48° C.), and a cloud point of about −40° C. or less (particularly about −41 to −51° C.). The lubricant base oil exhibits excellent low-temperature properties as its pour point and cloud point decrease down to about −50 to −40° C., respectively, resulting in omitting an isomerization step that should be conducted in conventional techniques. It may have a kinematic viscosity of about 6 to 10 cSt, and particularly about 6.3 to 9.3 cSt (100° C.).

However, an isomerization step may be selectively employed in order to produce a special lubricant base oil with higher low-temperature properties according to the purpose of the lubricant base oil. This isomerization may be conducted in the presence of a catalyst in which a metal of Group 10 (for example, platinum, palladium or a combination thereof) is supported on mesoporous zeolite (e.g., EU-1, ZSM-35, ZSM-11, ZSM-57, NU-87, ZSM-22, EU-2, EU-11, ZBM-30, ZSM-48, ZSM-23 or a combination thereof).

A better understanding of the present invention may be obtained through the following examples which are set forth to illustrate, but are not to be construed as limiting the present invention.

Example 1

Olefin Conversion of Stearic Acid Under $N_2$ Atmosphere

A decarbonylation reaction was performed on C18 stearic acid in an autoclave (feasibility test).

Briefly, 11.38 g of stearic acid was mixed with 0.51 g of $FeCl_2$ anhydrate (catalyst), 4.2 g of triphenylphosphine, and 4.08 g of acetic anhydride in a 50 cc autoclave.

Subsequently, the reactor was purged twice with $N_2$ at room temperature while the reactants were stirred at 200 rpm. Next, the reaction temperature was slowly elevated to 240° C. and maintained for 10 min at the temperature, followed by shut-down.

After the temperature was decreased, the autoclave was opened, and a mixture of the catalyst and the reactants, and the reaction product were recovered using n-heptane.

The recovered catalyst and reaction product were separated from each other by filtration. The catalyst was separately stored for reuse, and the reaction product filtrate was suspended in 2 L of deionized water (DI-water) and stirred overnight. The reaction product was separated from DI-water using a separatory funnel, and again filtered using celite powder. From this resulting filtrate, n-haptane was selectively removed using a vacuum distillation instrument (Spaltrohr HMS 300 C, Fischer technology), a final reaction product is recovered. The recovered reaction product was measured for conversion rate by SimDist analysis, and examined for alpha-olefins selectivity in the olefin product and for other side reactions by GC-MS analysis. The results are summarized in Table 5, below.

Example 2

Olefin Conversion of Stearic Acid Under CO Atmosphere

The decarbonylation of stearic acid was performed in the same manner as in Example 1, with the exception that the reaction atmosphere was set to be changed from 5 bars or 20 bars of CO, instead of 1 bar of $N_2$. In this regard, the experiment was carried out for a reaction time of 1 min, 10 min, 1 hr, and 3 hrs.

Figure 6:
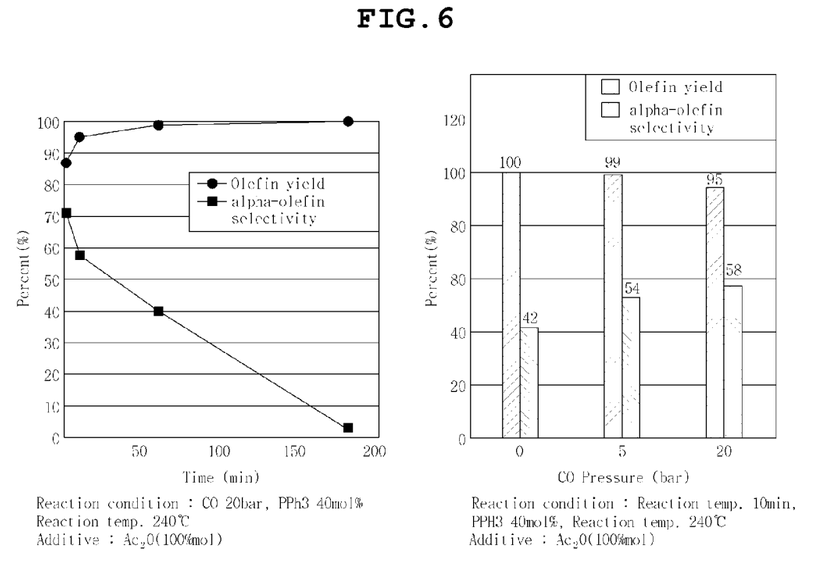
FIG. 6 shows graphs in which olefin yields and alpha-olefin selectivity are plotted versus reaction time and CO pressure when stearic acid is decarboxylated as in Example 2.
Figure 7:
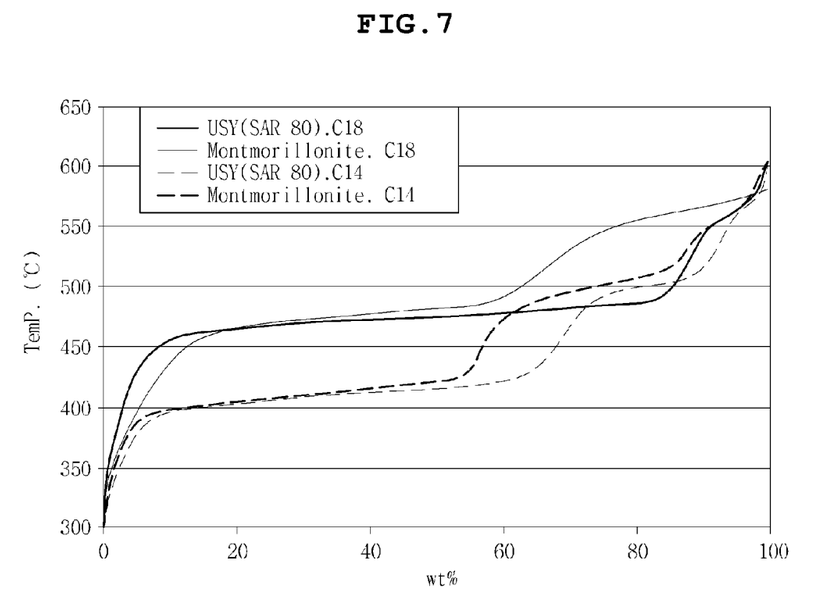
FIG. 7 is a graph showing SimDist analysis results according to kinds of the oligomerization catalysts used in Example 3.

The post-treatment and analysis of the reaction product obtained thus was carried out in the same manner, and the results are summarized in Table 5, below. In FIG. 6, olefin yields and alpha-olefin selectivity are plotted versus reaction time and CO pressure.

TABLE 5

| Run No. | Ligand (mo 1%) | Atmosphere | Rxn. Time | Yield (%) (α-olefin + internal olefin) | Selectivity (%) (α-olefin/internal olefin) |
|---|---|---|---|---|---|
| 1 | $PPh_3$ (40) | $N_2$ 1 bar | 10 min | 100 | 42/58 |
| 2 | $PPh_3$ (40) | CO 5 bar | 10 min | 99 | 54/46 |
| 3 | $PPh_3$ (40) | CO 5 bar | 3 h | 100 | 33/67 |
| 4 | $PPh_3$ (40) | CO 20 bar | 1 min | 87 | 71/29 |
| 5 | $PPh_3$ (40) | CO 20 bar | 10 min | 95 | 58/42 |
| 6 | $PPh_3$ (40) | CO 20 bar | 1 h | 99 | 40/60 |
| 7 | $PPh_3$ (40) | CO 20 bar | 3 h | 100 | 3/97 |
| 8 | DPPPent (20) | CO 20 bar | 3 h | 83 | 30/70 |

As is understood from the data, the decarbonylation activity was generally in high levels, but the double bond at alpha position was shifted toward the center of the carbon chain with the lapse of reaction time. As shown in FIG. 6, a longer decarbonylation time resulted in higher reaction activity (yield), but lower alpha-olefin selectivity. The alpha-olefin selectivity was increased by reducing the decarbonylation time and elevating the CO pressure. In this case, the overall olefin conversion rate was somewhat reduced.

The data also show that when DPPPent(diphenyl phosphine pentane), instead of TPP (triphenyl phosphine), was used as a chelating agent (ligand) (Run No. 8), the olefin conversion rate was lower even after the reaction of 3 hours, compared to the use of TPP, but the alpha-olefin selectivity was somewhat improved. Fully considering the experimental data, there is a strong likelihood that alpha-olefin selectivity can be controlled with the kind of the ligand of catalyst chelating agent. That is, different ligands result in different reaction rates of the decarbonylation (for example, when one ligand is substituted with another, the overall decarbonylation rate is reduced, but the alpha-olefin selectivity can be increased).

Example 3

Production of Olefinic Lubricant Base Oil from C14 or C18 Alpha-Olefin

To examine whether the products produced by the oligomerization of olefins obtained through decarbonylation have suitable properties as lubricant base oils, reference feeds were oligomerized, and analyzed for physical properties. For use as the reference feeds, C14 and C18 alpha-olefins (Aldrich) were purchased.

In a 500 cc glass flask, 200 g of C14 or C18 alpha-olefin was mixed with 20 g of zeolite or montmorillonite by stirring at 500 rpm, and heated to 180° C. Once being elevated to 180° C., the reaction temperature was maintained for about 3 to 6 his, followed by reaction shut-down.

As the zeolite catalyst, Y-zeolite having an SAR (silica alumina ratio) of 5.2, 30 or 80 was used so as to examine the effect of SAR on oligomerization. Montmorillonite was also analyzed for activity difference between 10K and 30K catalysts. A fresh RFCC catalyst prepared from USY zeolite and kaolin clay (Fresh cat.) was evaluated, together with the spent catalyst of E-cat., for oligomerization activity. Moreover, activities of strong acid site materials such as beta-zeolite and niobic acid, and weak acid site materials such as kaolin were measured.

Following the completion of the reaction, the catalyst and reaction product were separated from each other by filtration. The catalyst was separately stored for recycling, and the reaction product filtrate was stored for used in hydrogenation. The hydrogenation was carried out using a NiMo/$ZrO_2$ catalyst in a CSTR reactor. Under the condition of a temperature of 200° C., an $H_2$ pressure of 20 bar, a space velocity (WHSV) of 0.5 $hr^{-1}$, and a GOR of 1000 $Nm^3/m^3$, the reaction was carried out to selectively remove double bonds in the reaction product. The resulting reaction product was measured for conversion rate by SimDist analysis, and for other side reactions by GC-MS analysis. The results are summarized in Table 6, below.

TABLE 6

| Olefin | Catalyst | Temp. (° C.) | Time (h) | Conversion (%) | Dimer (%) | Trimer (%) | Tetramer (%) | D/T+ |
|---|---|---|---|---|---|---|---|---|
| C18 α-Olefin | USY Zeolite (SAR 5.2) | 180 | 3 | 22 | 20 | 2 | — | 9.50 |
| | USY Zeolite (SAR 30) | 180 | 4 | 58 | 52 | 6 | — | 8.50 |
| | USY Zeolite (SAR 80) | 180 | 4 | 72 | 64 | 8 | — | 7.88 |
| | USY Zeolite (SAR 80) | 180 | 6 | 85 | 67 | 19 | — | 3.56 |
| | Beta Zeolite (SAR 300) | 180 | 6 | 39 | 33 | 6 | — | 5.33 |
| | RFCC Fresh Cat. | 180 | 6 | 43 | 37 | 6 | — | 6.17 |
| | RFCC E-Cat | 180 | 6 | 45 | 39 | 6 | — | 6.33 |
| | Montmorillonite 10K | 180 | 6 | 77 | 45 | 32 | — | 1.42 |
| | Montmorillonite 10K | 180 | 16 | 80 | 45 | 35 | — | 1.29 |
| | Montmorillonite 30K | 180 | 6 | 65 | 67 | 33 | — | 2.03 |
| C14 α-Olefin | USY Zeolite (SAR 80) | 180 | 6 | 88 | 63 | 26 | 11 | 1.70 |
| | Montmorillonite 10K | 180 | 6 | 77 | 55 | 29 | 16 | 1.22 |

As is understood from the data of Table 6, Y-zeolite exhibited high selectivity for dimers while montmorillonite had relatively high selectivity for trimers or higher. However, this tendency, which was profound in C18 alpha-olefin, was alleviated in C14 alpha-olefin. As for Y-zeolite, its higher SAR resulted in a higher olefin conversion rate, but a lower D/T+ ratio (ratio of dimer to trimer or hither). Beta-zeolite showed low oligomerization activity. In spite of the fact that beat-zeolite is a strong acid site with a SAR of 300, the low activity shows that there is no direct relationship between the acidity and activity of zeolite. On the other hand, the RFCC E-cat. exhibited a conversion rate of about 45%, suggesting the novel use of RFCC E-cat., which has conventionally been discarded as an industrial waste.

To examine whether the produced oligomers have suitable properties as lubricant base oils, fractions obtained at 340° C. or higher of the final products are selectively separated using a fractionator, and analyzed for physical properties. As the fractionator, Spaltrohr HMS 300 C, Fischer technology, was used. The products were placed in a 500 cc flask, and fractionally distilled.

Figure 9:
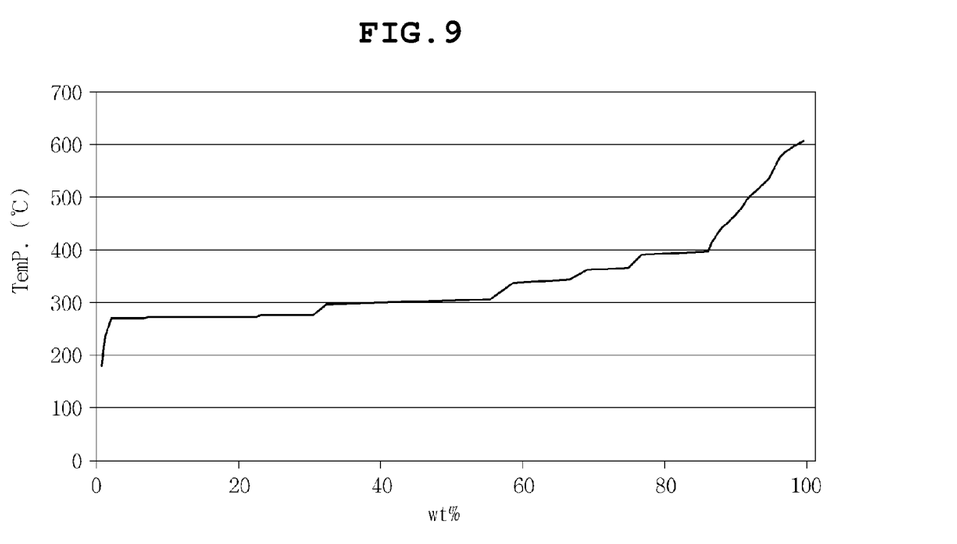
FIG. 9 shows a SimDist pattern of the liquid reaction product produced from PFAD at 240° C. by decarbonylation.

250 g of the reaction product obtained in Example 3 was introduced into a 500 cc flask and distillated in vacuo. That is, fractions with a boiling point of 144.3° C. or less were removed at a pressure of 1 torr or less, so that fractions with a boiling point of 340° C. or less under atmospheric pressure were selectively separated. In addition, fractions with a boiling point of 340° C. or higher were analyzed for physical properties including viscosity index, pour point, and cloud point. The results are given in Table 7, below. In addition, SimDist analysis patterns are depicted in FIG. 9.

TABLE 7

| Olefin | Catalyst | Dimer (%) | Trimer (%) | Tetramer (%) | D/T+ | 40 Vis (cSt) | 100 Vis (cSt) | VI | PP/CP (° C.) |
|---|---|---|---|---|---|---|---|---|---|
| C18 α-Olefin | USY Zeolite (SAR 80) | 64 | 8 | — | 7.88 | 25.68 | 5.77 | 177.8 | −7/−6 |
| | USY Zeolite (SAR 80)* | 67 | 19 | — | 3.56 | 31.19 | 6.18 | 151.6 | −12/−10 |
| | Montmorillo-nite 10K | 45 | 32 | — | 1.42 | 44.85 | 7.98 | 150.8 | −1/0 |
| C14 α-Olefin | USY Zeolite (SAR 80) | 63 | 26 | 11 | 1.70 | 19.19 | 4.58 | 152 | −43/−44 |
| | Montmorillo-nite 10K | 55 | 29 | 16 | 1.22 | 22.18 | 4.74 | 137 | −33/−33 |

As is understood from the data, the fractions with a boiling point of 340° C. or higher derived from C18 alpha-olefin, although generally high in viscosity index, had increased pour points and cloud points, and thus were observed to require additional isomerization for improving low-temperature properties. In contrast, the C14 alpha-olefin-derived fractions with a boiling point of 340° C. or higher were generally high in viscosity index, and low in pour point and cloud point, showing physical properties suitable for use as a lubricant base oil.

According to the above measurement result, when biomass-derived C15 and C17 olefin, especially α-Olefin and internal olefin are properly mixed, it is predictable to improve all of the viscosity index, pour point and cloud point.

Example 4

Preparation of PFAD-Derived C15 and C17 Mixed Olefins

Based on the experimental data of reference feeds in Examples 1 to 3, examination was made of the possibility of commercializing the practical feed material. For this, PFAD (Palm Fatty Acid Distillate), which is inexpensive, was used.

To a 4 L autoclave was added 455.2 g of PFAD, followed by 20.4 g of $FeCl_2$ anhydrate, 168 g of triphenylphosphine, and 163.2 g of acetic anhydride in that order. These materials were physically mixed, and the reactor was purged twice with $N_2$ and filled with $N_2$ to set a total reaction pressure of 20 bar. Then, the temperature was elevated to 180 to 240° C. and maintained for 10 min at that temperate, followed by shut-down.

The post-treatment and analysis of the reaction product obtained thus was carried out in the same manner as in Example 1, and the results are summarized in Table 8, below.

TABLE 8

| Run No. | Rxn. Temp. (° C.) | Total Yield (%) | C15 Olefin Yield (%) | C17 Olefin Yield (%) |
|---|---|---|---|---|
| 1 | 240 | 54.4 | 31.6 | 22.8 |
| 2 | 200 | 54.0 | 28.8 | 25.2 |
| 3 | 190 | 48.3 | 25.5 | 22.8 |
| 4 | 180 | 47.7 | 25.5 | 22.2 |

As shown in the table, the total olefin yield tended to decrease with a decrease in reaction temperature. In contrast to the reference feed, the practical feed material guaranteed an olefin yield of as high as about 54%. Because this value was obtained by use of a 4 L autoclave, there is a likelihood that an additional improvement could be brought about in the yield.

In addition, GC-MS analysis showed that C15 and C17 mixed olefins were selectively produced, with almost no side reactions occurring. Particularly, side reactions were significantly suppressed as the reaction temperature decreased. Derived from saturated C16 fatty acid, C15 olefin contained one double bond. For C17 olefins, their double bonds were observed to be two or more.

Figure 8:
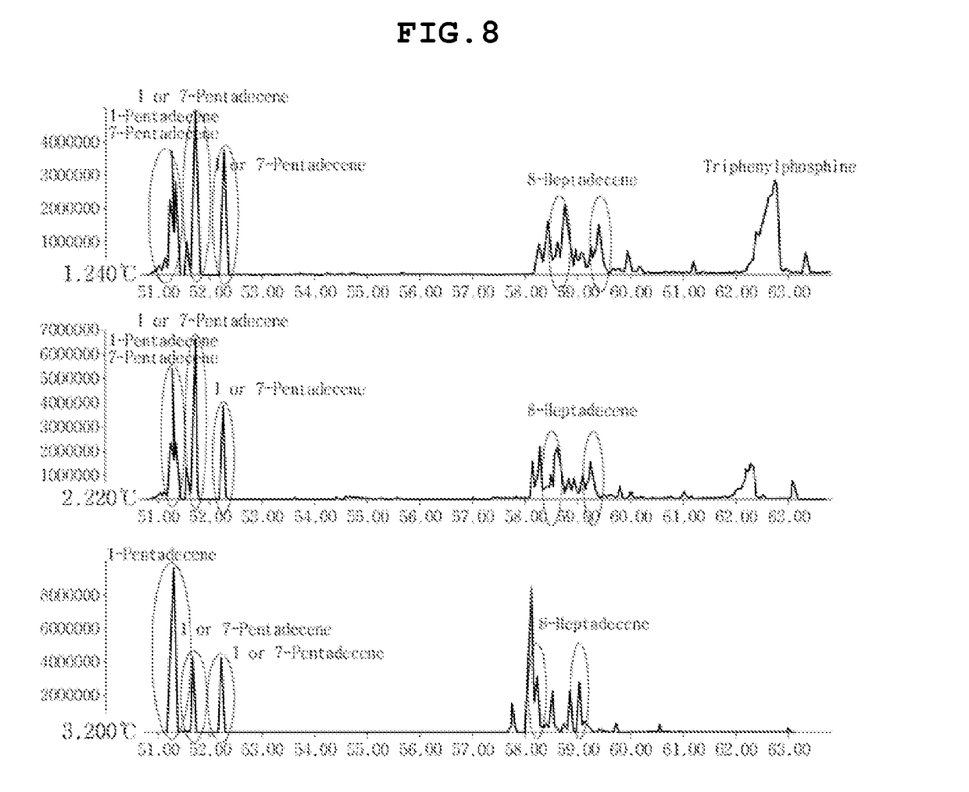
FIG. 8 shows GC-MS analysis peak patterns of the mixed olefins produced from PFAD (Palm Fatty Acid Distillate) by decarbonylation as in Example 4.

FIG. 8 shows GC-MS analysis peak patterns of C15 and C17 mixed olefins produced from PFAD by decarbonylation in a 4 L autoclave according to reaction temperatures. As can be seen, the peak of the alpha-olefin 1-pentadecene increased with a decrease in reaction temperature. In addition, the C15 and C17 mixed olefins were found to contain alpha-olefin as well as internal olefins.

FIG. 9 shows a SimDist pattern of the liquid reaction product produced from PFAD at 240° C. by decarbonylation. Because C15 and C17 olefins boil at 270° C. and 300° C., respectively, the liquid product was fractionally distilled (Spaltrohr HMS 300 C; Fischer technology) to selectively separate fractions with a boiling point of about 260 to 310° C. as C15 and C17 mixed olefins.

Example 5

Production of Olefinic Lubricant Base Oil from PFAD-Derived C15 and C17 Mixed Olefins The mixed olefins separated in Example 4 were oligomerized (catalyst: montmorillonite 10K) and hydrogenated as in Example 3 to produce a lubricant base oil. Herein, fractions with a boiling point of 340° C. were used as a lubricant base oil. PFAD-derived C15 and C17 mixed olefins were oligomerized in the presence of a montmorillonite catalyst. Hydrogenation saturated the olefinic oligomers thus obtained, as follows.

Hydrogenation was conducted in a CSTR reaction using a $PtPd/SiO_2$—$Al_2O_3$ catalyst. In the catalyst, 0.6% by weight of Pt and 0.8% by weight of Pd were supported on a silica-alumina support containing about 74% by weight of silica and about 25% by weight of alumina.

The $PtPd/SiO_2$—$Al_2O_3$ catalyst was prepared as follows. As a support, 100 g of silica-alumina (containing silica 74% by weight, alumina 25% by weight, and $Na_2O$ 0.32% by weight; specific surface area 448 $m^2/g$; density 0.48 g/cc; PV(Hg) 0.72 cc/g; median pore size 93 □) was placed in a glass bottle into which a $Pt(NH_3)_2(NO_2)_2$ solution (10% by weight Pt solution) and a $Pd(NH_3)_2(NO_2)_2$ solution (10% by weight Pd solution) were then introduced by incipient wetness. The Pt and Pd solutions were introduced to impregnate Pt and Pd in amounts of 0.6 and 0.8% by weight, respectively, and dried at room temperature. Thereafter, they were maintained at 150° C. for 3 hrs and then at 400° C. for 3 hrs in a calcinations furnace to afford a $PtPd/SiO_2$—$Al_2O_3$ catalyst.

The hydrogenation was performed in a CSTR reactor. The CSTR reactor was loaded with 6 cc of the $PtPd/SiO_2$—$Al_2O_3$ catalyst, and with silica beads on and beneath the catalyst bed. Then, $N_2$ was introduced at a rate of 60 cc/min to a N2 pressure of 5 bar and the reactor was heated to 150° C. and maintained at the temperature for 2 hrs. Next, the pressure was reduced to atmospheric pressure, and the reactor was purged with $H_2$. In this regard, $H_2$ was introduced at a rate of 60 cc/min to a pressure of 160 bar, and the reaction temperature was elevated to 250° C. and maintained at that temperature for 2 hrs.

Subsequently, the reactor was cooled to 200° C. while the $H_2$ flow condition was changed to 80 cc/min. The product obtained by oligomerization was introduced at a rate of 0.16 cc/min into the reactor to eliminate the double bonds from the oligomerized product. The elimination of double bonds was monitored by BI analysis. The weight loss of the reaction product was 5% or less, and a BI of zero demonstrated that the hydrogenation was conducted well. The resulting reaction product was measured for conversion rate by SimDist analysis, and examined for side reactions by GC-MS analysis. The results are summarized in Table 95, below.

TABLE 9

| Production Temp. of Mixed Olefin (° C.) | Oligomerization Temp. (° C.) | Rxn. Time (h) | Yield (%) | Dimer (%) | Trimer or higher (%) | D/T+ |
|---|---|---|---|---|---|---|
| 190 | 180 | 3 | 50 | 32 | 18 | 1.82 |
|  | 200 | 3 | 72 | 40 | 32 | 1.25 |
| 200 | 200 | 4 | 68 | 37 | 31 | 1.19 |
| 220 | 180 | 3 | 52 | 31 | 21 | 1.50 |
| 240 | 250 | 3 | 62 | 44 | 18 | 2.33 |

As can be seen in Table 9, the oligomerization efficiency was on the order of 60 to 70%, and the oligomerization activity decreased with a decrease in reaction temperature. On the other hand, a higher oligomerization temperature resulted in a higher polymerization yield, but causes more severe side reactions, such as the production of isomers, which cannot be recycled as feed materials in the reaction. Hence, it is preferred that the reaction temperature be maintained at 200° C. or less.

Example 6

Analysis of Physical Properties of Lubricant Base Oil Produced from PFAD

Using Spaltrohr HMS 300 C, Fischer technology, the fraction (lubricant base oil) with a boiling point of 340° C. among others was analyzed for viscosity index, pour point, and cloud point, as in Example 3. The results are summarized in Table 10, below.

that Group III lubricant base oil is required to have a viscosity index of at least 120, and a pour point and a cloud point, both, of −20° C. or less, the fraction produced from the practical material PFAD corresponded to Group III+ lubricant base oil. Also, in consideration of recycling upon the oligomerization, 54 weight parts of a lubricant base oil is expected to be produced from 100 weight parts of PFAD, based on the PFAD-derived olefin yield of 54%. Therefore, when the current market prices of PFAD and Group III+ lubricant base oils are taken into consideration, this production yield is high enough to find commercial applications even if the process cost is estimated to be high.

An important consideration in analyzing physical properties of lubricant base oils is the effect of decarbonylation temperatures on physical properties of lubricant base oils. As demonstrated in Examples 1, 2 and 4, the positions of double bonds in olefins can be selectively controlled by modifying decarbonylation conditions. Likewise, for PFAD, the alpha-olefin selectivity was shown to vary depending on decarbonylation temperatures in Example 4. In addition, alpha-olefin selectivity was increased with a decrease in decarbonylation temperature. Particularly, data of Table 10 show that the viscosity index as well as both the pour point and the cloud point was increased with a decrease in decarbonylation temperature. Thus, physical properties of the lubricant base oils can be controlled by adjusting decarbonylation conditions.

In addition, the lubricant base oils produced were analyzed for the content of aromatics or naphthene by LC-aromatics and GC-MS. Neither aromatics nor by-products such as naphthene were detected in the lubricant base oils. EA-CHONS analysis was performed to measure contents of compounds containing heteroatoms, such as oxygen, sulfur and/or nitrogen atoms, in the lubricant base oils. Less than 0.1% by weight of heteroatom-containing compounds were detected, indicating that the lubricant base oil substantially does not contain impurities.

Example 7

Recycle Probability of Oligomerization Catalyst

Examination was made to see whether the spent catalyst recovered after being used in oligomerization as in Example 3 could be recycled and applicable.

In this regard, the montmorillonite catalyst recovered after completion of the oligomerization was placed in a furnace and calcined at 550° C. for 6 hrs. Then, the spent

TABLE 10

| Production Temp. of Mixed Olefin (° C.) | Oligomerization Catalyst | Dimer (%) | Trimer (%) | D/T+ | 40 Vis (cSt) | 100 Vis (cSt) | VI (a.u.) | PP/CP (° C.) |
|---|---|---|---|---|---|---|---|---|
| 240 | Montmorillonite 10K | 44 | 18 | 2.33 | 42 | 6.8 | 118 | −48 |
| 220 | Montmorillonite 10K | 31 | 21 | 1.50 | 59 | 8.8 | 122 | −43 |
| 200 | Montmorillonite 10K | 37 | 31 | 1.19 | 48 | 7.7 | 125 | −43 |
| 190 | Montmorillonite 10K | 40 | 32 | 1.25 | 64 | 9.3 | 125 | −41 |

As is understood from the data, the fraction was measured to have a pour point and a cloud point both less than −40° C., and a viscosity index of 118 to 125. In light of the fact catalyst was used in the same oligomerization as in Example 3 and analyzed for catalytic activity. The results are shown in Table 11 and FIG. 10.

TABLE 11

| Olefin | Catalyst | Temp. (° C.) | Time (h) | Conversion (%) | Dimer (%) | Trimer (%) | Tetramer (%) | D/T+ |
|---|---|---|---|---|---|---|---|---|
| C18 α-Olefin | Montmorillonite 10K | 180 | 6 | 77 | 45 | 32 | — | 1.42 |
| | Montmorillonite 10K (Recycled) | 180 | 6 | 76 | 46 | 30 | — | 1.53 |

Figure 10:
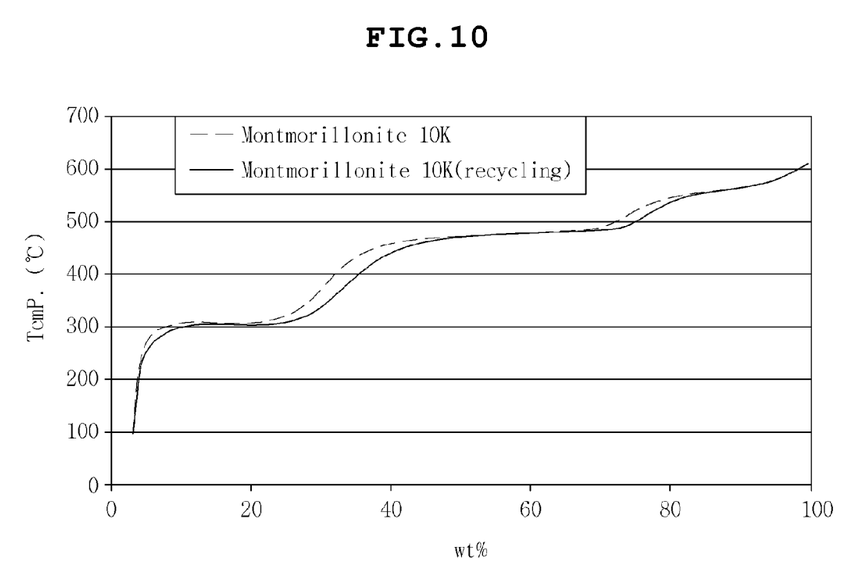
FIG. 10 is a graph showing SimDist analysis patterns of the products obtained using the fresh oligomerization catalyst and the recycled catalyst thereof in Example 3, as analyzed in Example 7.

As can be seen in Table 11 and FIG. 10, there were almost no differences in oligomerization activity between the fresh catalyst and the recycled catalyst. Since heteroatom (oxygen, sulfur and/or nitrogen)-containing compounds substantially did not exist in the feed material and the product, the recycled catalyst was theoretically expected to undergo no irreversible inactivation. Further, since the decarbonylation mechanism does not retain a factor that possibly causes the irreversible inactivation of the catalyst metal-chelate, the recycled catalyst was expected to effectively perform the catalytic activity in the oligomerization.

Accordingly, simple modifications, additions, and substitutions of the present invention should also be understood as falling within the scope of the present invention, without departing from the scope and spirit of the invention as disclosed in the accompanying claims.

The invention claimed is:

1. A method for producing a lubricant base oil from a biomass-derived fatty acid, comprising:
    a) providing biomass-derived mixed fatty acids;
    b) decarbonylating the mixed fatty acids to produce mixed olefins, wherein a double bond is formed at an alpha position in the mixed olefins, and the double bond is shifted toward the center of carbon chains to produce internal olefins;
    c) oligomerizing the mixed olefins to produce an olefinic lubricant base oil; and
    d) performing hydrogenation to remove olefins in the olefinic lubricant base oil,
    wherein the step b) is carried out in presence of a transition metal-chelate catalyst, the transition metal being one or more selected from transition metals in Groups 8 to 10 on Periodic Table, a chelator being a phosphine ligand,
    wherein the transition metal-chelate catalyst contains triphenylphosphine or diphenyl phosphine-$C_{4-7}$ paraffin as a chelator, and further either or both of CO and halogen as a ligand, and an acid anhydride is introduced to a reaction system during the decarbonylation under a CO or $N_2$ atmosphere,
    wherein olefins in the mixed olefins of step b) are fewer by one in the number of carbon atoms than corresponding fatty acids in the mixed fatty acids of step a).

2. The method of claim 1, wherein carbon atoms of the mixed fatty acids of step a) range from 4 to 24.

3. The method of claim 2, wherein the mixed fatty acids contain a fatty acid of 16 carbon atoms, a fatty acid of 18 carbon atoms, or a combination thereof in an amount of at least 80% by weight.

4. The method of claim 1, wherein the mixed fatty acids of step a) are fatty acids derived from triglyceride of biomass by de-esterification, fatty acids contained in biomass itself, or a combination thereof.

5. The method of claim 1, wherein the mixed fatty acids have a double bond content of 60% or less of a total carbon bonds thereof.

6. The method of claim 1, wherein the step a) further comprises a pre-hydrotreatment (pre-HDT) step in which at least a part of double bonds of the mixed fatty acids is removed by saturation.

7. The method of claim 2, wherein the mixed fatty acids are fatty acid distillates separated from biomass.

8. The method of claim 1, wherein the decarbonylation is carried out at a temperature of 120 to 400° C. under a pressure of 50 bar or less.

9. The method of claim 1, wherein the oligomerization is carried out in presence of a cationic polymerization catalyst, the cationic polymerization catalyst being zeolite, clay, SAPO, AlPO, or aluminum (A)-supported mesoporous silica.

10. The method of claim 9, wherein the cationic polymerization catalyst is montmorillonite, Y-zeolite having a SAR of 30 to 150, an RFCC catalyst, or beta-zeolite.

11. The method of claim 9, a product of the oligomerization has a weight ratio of dimer/trimer or higher of 0.1~100, and a chain length of 15 to 33 carbon atoms.

12. The method of claim 9, wherein the oligomerization is carried out at a temperature of 120 to 400° C.

13. The method of claim 1, wherein the hydrogenation is carried out at a reaction temperature of 150 to 500° C. and at a GOR ($H_2$/feed ratio) of 300 to 2000 $Nm^3/m^3$ under a $H_2$ pressure of 5 to 200 ba.

14. The method of claim 1, wherein the lubricant base oil meets a Group III+ standard.

15. The method of claim 14, wherein the lubricant base oil has a viscosity index of at least 118, a pour point of −40° C. or less, and a cloud point of −40° C. or less.

16. The method of claim 1, wherein the biomass is animal biomass, vegetable biomass, or a combination thereof, the animal biomass being fish oil, beef tallow, lard, sheep tallow, or butter, the vegetable biomass being sunflower seed oil, canola oil, palm oil, corn oil, cotton seed oil, rapeseed oil, linseed oil, safflower seed oil, oat oil, olive oil, palm oil, peanut oil, apricot seed oil, almond oil, avocado oil, olive oil, camellia oil, rice bran oil, cotton seed oil, peanut oil, walnut oil, rapeseed oil, rice bran oil, linseed oil, sesame oil, soybean oil, castor oil, cocoa butter, or palm kernel oil.

* * * * *

UNITED STATES PATENT AND TRADEMARK OFFICE
CERTIFICATE OF CORRECTION

| | |
|---|---|
| PATENT NO. | : 9,976,098 B2 |
| APPLICATION NO. | : 14/782957 |
| DATED | : May 22, 2018 |
| INVENTOR(S) | : Hee Jung Jeon et al. |

It is certified that error appears in the above-identified patent and that said Letters Patent is hereby corrected as shown below:

On the Title Page

Under (71) Applicant:
Please replace the second applicant name from "SK LUBRICANTS CO., LTD., Seoul (KR)" to "SK ENMOVE CO., LTD., Seoul (KR)"; and Under (73) Assignee:
Please replace the second assignee name from "SK LUBRICANTS CO., LTD., Seoul (KR)" to "SK ENMOVE CO., LTD., Seoul (KR)".

Signed and Sealed this
Thirteenth Day of August, 2024

Katherine Kelly Vidal
*Director of the United States Patent and Trademark Office*